US012293395B2

(12) United States Patent
Zagorin

(10) Patent No.: US 12,293,395 B2
(45) Date of Patent: May 6, 2025

(54) SYSTEM, NON-TRANSITORY COMPUTER-READABLE MEDIA, AND METHOD FOR ELECTRONIC THIRD-PARTY NEGOTIATION AUTOMATION SYSTEM AND TOOL

(71) Applicant: Arkestro Inc., San Francisco, CA (US)

(72) Inventor: Edmund Adam Zagorin, San Francisco, CA (US)

(73) Assignee: Arkestro Inc., San Francisco, CA (US)

( * ) Notice: Subject to any disclaimer, the term of this patent is extended or adjusted under 35 U.S.C. 154(b) by 0 days.

(21) Appl. No.: 18/462,370

(22) Filed: Sep. 6, 2023

(65) Prior Publication Data

US 2023/0410173 A1 Dec. 21, 2023

Related U.S. Application Data

(62) Division of application No. 16/267,580, filed on Feb. 5, 2019, now Pat. No. 11,961,131.

(Continued)

(51) Int. Cl.
*G06Q 30/0601* (2023.01)
*G06Q 30/0201* (2023.01)

(52) U.S. Cl.
CPC ..... *G06Q 30/0617* (2013.01); *G06Q 30/0206* (2013.01); *G06Q 30/0605* (2013.01); *G06Q 30/0611* (2013.01)

(58) Field of Classification Search
CPC ............................ G06Q 30/08; G06Q 50/188
See application file for complete search history.

(56) References Cited

U.S. PATENT DOCUMENTS

2002/0147655 A1 10/2002 Say
2007/0208630 A1 9/2007 Chatter et al.

(Continued)

OTHER PUBLICATIONS

T. S. Chandrashekar, Y. Narahari, C. H. Rosa, D. M. Kulkarni, J. D. Tew and P. Dayama, "Auction-Based Mechanisms for Electronic Procurement," in IEEE Transactions on Automation Science and Engineering, vol. 4, No. 3, pp. 297-321, Jul. 2007, doi: 10.1109/TASE.2006.885126. (Year: 2017).*

(Continued)

*Primary Examiner* — Matthew E Zimmerman
*Assistant Examiner* — Latasha D Ramphal
(74) *Attorney, Agent, or Firm* — Lee & Hayes, P.C.

(57) ABSTRACT

A third-party negotiation automation tool for generating cost estimates on behalf of a seller is described herein. In response to receiving a request for a product from a buyer, a seller may choose to participate in a negotiation for fulfilling the request. The system may utilize one or more data sources, such as user-provided data, third-party data, and the like, to generate a cost estimate on behalf of the seller for fulfilling the request. The seller may choose to accept, modify, or decline the generated cost estimate before providing the cost estimate to the buyer for acceptance. This process may continue for one or more rounds, dependent upon the request, with the final cost estimates provided to the buyer for selection at the conclusion of the one or more rounds. In this way, the cost estimates generated on behalf of the seller may be optimized, thereby reducing the likelihood of inaccurate cost estimates and reducing the system resources required to process large volumes of bids received at or around the same time.

20 Claims, 7 Drawing Sheets

Related U.S. Application Data

(60) Provisional application No. 62/626,230, filed on Feb. 5, 2018.

(56) References Cited

U.S. PATENT DOCUMENTS

| | | | | |
|---|---|---|---|---|
| 2008/0040141 | A1* | 2/2008 | Torrenegra | G06Q 30/08 705/26.1 |
| 2009/0216655 | A1* | 8/2009 | Nguyen | G06Q 30/08 705/26.1 |
| 2012/0310764 | A1 | 12/2012 | Sinsheimer et al. | |
| 2014/0278568 | A1* | 9/2014 | Ekman | G06Q 30/0205 705/4 |
| 2018/0018732 | A1 | 1/2018 | Wang | |
| 2019/0026820 | A1* | 1/2019 | Adolphe | G06Q 10/06393 |
| 2019/0066163 | A1 | 2/2019 | Rubinstein et al. | |
| 2019/0244268 | A1 | 8/2019 | Zagorin | |

OTHER PUBLICATIONS

Office Action for U.S. Appl. No. 16/267,580, mailed on Feb. 28, 2023, Inventor #1 Edmund Adam Zagorin, "Electronic Third-Party Negotiation Automation System and Tool", 38 pages.

Office Action for U.S. Appl. No. 16/267,580, mailed on Aug. 17, 2021, Zagorin, "Electronic Third-Party Negotiation Automation System and Tool", 31 Pages.

Office Action for U.S. Appl. No. 16/267,580, mailed on Mar. 29, 2022, Zagorin, "Electronic Third-Party Negotiation Automation System and Tool", 36 Pages.

Office Action for U.S. Appl. No. 16/267,580, mailed on Aug. 17, 2022, Zagorin, "Electronic Third-Party Negotiation Automation System and Tool", 34 pages.

Park, "The P-Strategy: An Adaptive Agent Bidding Strategy Based on Stochastic Modeling for Continuous Double Actions", Order No. 9959837, University of Michigan, retrieved at << https://dialog.proquest.com/professional/docview/304521294?accountid=131444>>, 1999, 196 pgs.

* cited by examiner

SYSTEM, NON-TRANSITORY COMPUTER-READABLE MEDIA, AND METHOD FOR ELECTRONIC THIRD-PARTY NEGOTIATION AUTOMATION SYSTEM AND TOOL

CROSS REFERENCE TO RELATED APPLICATIONS

This application is a divisional of and claims priority to U.S. patent application Ser. No. 16/267,580, filed Feb. 5, 2019, which claims priority to Provisional Application No. 62/626,230 filed Feb. 5, 2018, which are incorporated herein by reference.

BACKGROUND

Conventional auction systems allow a buyer to request a product (e.g., goods and/or services) on a platform and sellers may present a bid for providing the product. In this instance, once the bidding period is over, the seller may choose the bid that best suits their needs. For example, the buyer may award the contract to the winning bid, such as the lowest cost bid, the quickest delivery period, and the like. Typically, the seller may formulate their bid based on their internal data such as the current cost of the product, inventory, relationship with the buyer, and the like. This process may lead to bids that are not fully optimized and may result in cost inefficiencies for both the buyer and the seller.

BRIEF DESCRIPTION OF THE DRAWINGS

Features of the present disclosure, its nature and various advantages, may be more apparent upon consideration of the following detailed description, taken in conjunction with the accompanying drawings.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
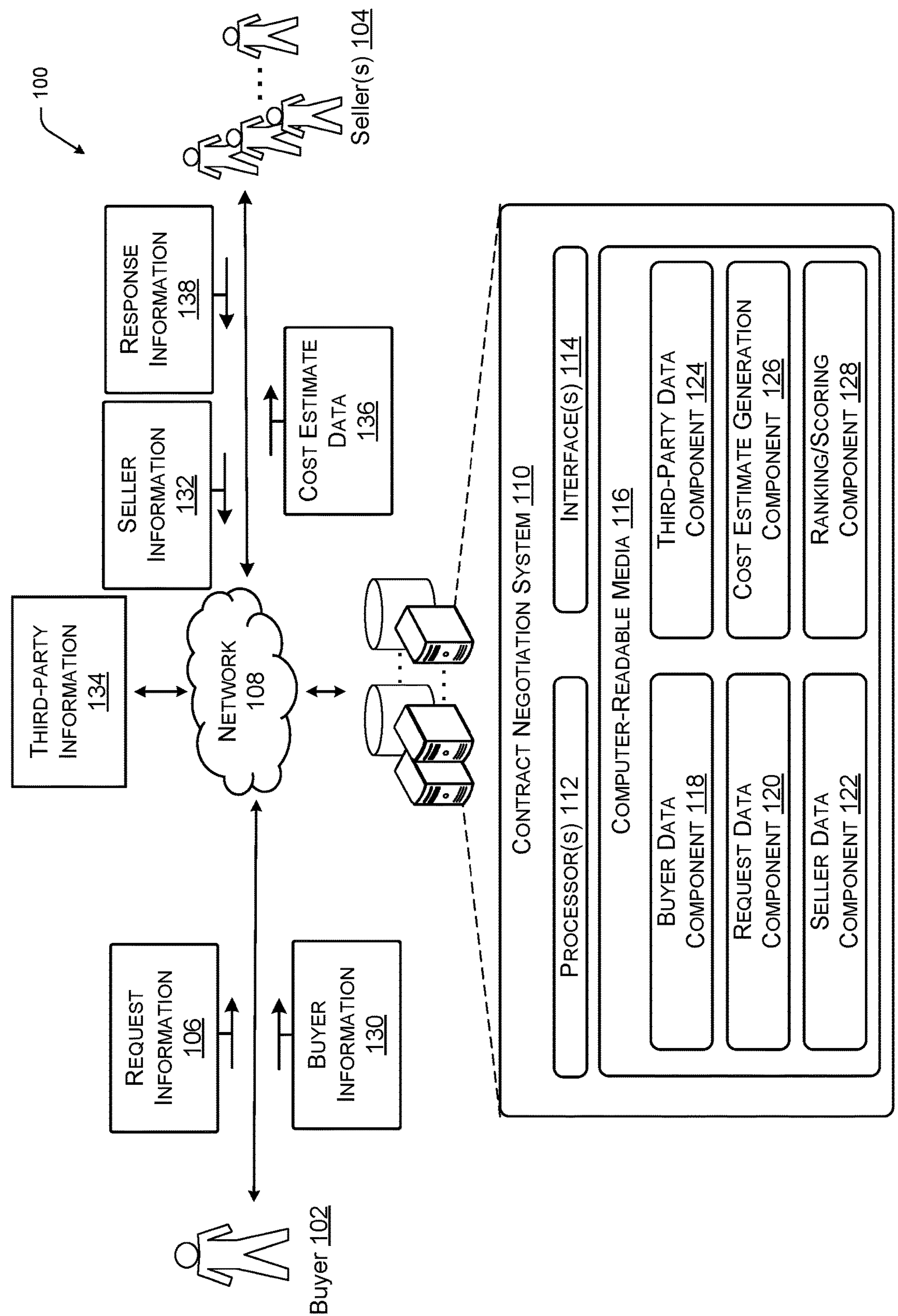
FIG. 1 illustrates an example environment for automating third-party contract negotiations according to some implementations.

Techniques described herein are directed to, in part, an electronic third-party contract negotiation system and/or procurement automation tool. In particular, the third-party contract negotiation system includes an electronic tool for generating cost estimate bids for providing a product to a seller. The system allows cost estimates, or bids, to be generated on behalf of a seller or service provider in response to a buyer request for a product provided by the seller or service provider. To provide an example, a buyer may request a product, such as a good or service, via a contract negotiation or auction platform. In response, the request may be provided to one or more sellers capable of fulfilling the request. Should the seller decide to make a bid for fulfilling the request, the system may utilize data, such as buyer-provided data (e.g., buyer inputs, stored buyer data, etc.), market data, third-party data, historical data, and the like, to generate a cost estimate on behalf of the seller for fulfilling the request, referred to herein as a should-cost value (e.g., the cost that the providing the product should cost the seller). Upon receiving the cost estimate, the seller has a predetermined period of time to choose to accept, modify, or deny the estimate and submit the generated cost estimate for acceptance by the buyer. Alternatively, or in addition, the seller may provide the system authorization to accept the bid on their behalf. The process may continue for one or more bidding rounds, determined by the system and/or buyer, with the final cost estimates of each seller being provided to the buyer at the conclusion of the auction. Based on the final cost estimates, the buyer may select a seller to provide the product.

As is known, conventional auction systems are configured to allow a buyer to make a request for a product and allow the seller to provide bids in hopes of being selected. For example, in response to the buyer's request, in the conventional auction system, the seller may utilize internal data (e.g., data known to the seller), such as current seller's inventory, seller's supplier costs, and the like, to formulate a bid. The bid may represent the cost at which that the seller is willing or desires to provide the product or services. However, utilizing only internal seller data may lead to inaccurate bids (e.g., bidding too high or too low). Alternatively, or in addition, the buyer may set an initial cost threshold associated with the product. That is, the buyer may stipulate, along with the request, a cost that the seller may not exceed in purchasing the product. As a result of providing an initial cost threshold, the bids provided by the sellers may be skewed to accommodate the boundaries provided by the buyer. The techniques for generating automated cost estimates described herein, however, help to formulate more accurate and efficient cost estimations for fulfilling the buyer's request for products or services.

Further, the techniques described herein may help prevent inefficient resource allocations and increase the processing capacity of the system components. For example, in conventional auction platforms, the seller may be motivated to provide bids at the end of the auction in order to provide the lowest bid and be selected by the buyer, often called bid sniping. When used, the bid sniping technique ensures that, in the conventional auction system, the seller providing the last bid wins, as the seller's competitors do not have time to re-bid. The practical result, in the conventional auction system, is that all bids by all sellers are held until the period of time to enter a bid is ending. This results in the conventional auction system implementing a large number of processing resources that are used only during the final moments of the auction, resulting in massive inefficacies and large spikes in bandwidth and computer resource consumption. In some cases, the conventional auction systems are unable to handle the volume of bids and, thus, some bids are lost, including a potential winning bid. To prevent bid sniping, many online conventional auction systems implement time extensions in response to each new winning bid being received, thereby allowing the seller's competitors additional time to re-bid, thereby preventing loss of a winning bid due to lack of computer resources. However, while the implementation of time extensions in conventional systems may prevent loss of winning bids and/or increases in the overall sale price, the large spikes in bandwidth and computer resource consumption are increased as the spike occurs at the expiration of each extended period of time, resulting in the conventional auction system that consumes far more computing resources and bandwidth than necessary.

The techniques and systems described herein are designed to prevent the large spikes in bandwidth and computer resources caused by the conventional auction systems. For example, the system discussed herein ensures that the seller has been provided with an optimized cost estimate prior to submission of the seller's bid. In addition, the seller may only view their personalized, generated cost estimate provided during each bidding round (e.g., each seller is provided by the system a personalized cost estimate). As a result, by generating an optimized cost estimate on behalf of the seller, and preventing the seller from viewing competing cost estimates, the incentive to place a last-minute bid in order to provide the lowest bid is decreased and/or removed. In this way, the system is less likely to receive an inundation of bids, thereby increasing the efficiency and resource allocation of the processing components (e.g., fewer recourse may be implemented as the processing period is expanded).

In some examples described below, the system may receive a request for a product from a first user, such as a buyer. The request may include information regarding the product (e.g., the good and/or service), buyer information (e.g., company information) buyer preferences (e.g., value preferences such as a preferred seller, level of expertise, product specifications, etc.), negotiation preferences (e.g., a number of bidding rounds, a time period for accepting the generated cost estimate, etc.), and the like. The buyer information may be utilized by the system to dictate negotiation specifications, generate cost estimates on behalf of the seller, rank the seller with respect to other sellers, and/or a score associated with each seller (e.g., indicating a likelihood that a seller will win).

The request may be provided to one or more additional users, such as sellers, capable of providing the requested product. For example, an indication of the request may be displayed to the user via a user interface associated with the negotiation platform. In some examples, the indication may provide an option to view the request and/or provide input regarding a desire to fulfill the request. For example, one or more sellers may view the request, and/or additional information provided by the seller, and may provide input indicating that the seller would like to fulfill the request (e.g., provide the requested good and/or service). At this time, or prior to this, the one or more sellers may provide information to the system regarding the seller and/or the seller's company (e.g., years in operation, number of employees, etc.), products provided, and the like. The seller information may likewise be utilized by the system to dictate negotiation specifications, generate cost estimates on behalf of the seller, rank the seller with respect to other sellers, and/or generating a score associated with each seller (e.g., a score indicating a likelihood that the seller will win). For example, a seller that has ten or more years of business history may be favored (e.g., selected by the system and/or the buyer at a higher cost) over a seller that has been in business less than one year.

In examples, the system may access data to aid in generating the cost estimate(s) on behalf of the seller(s) that have provided input indicating a desire to fulfill the buyer request. For example, the system may access the buyer data, the seller data, historical data (e.g., historical transaction data, pricing or product data, etc.), and/or one or more third-party resources such as market data, commodity data, and the like. The system may utilize this accessed data to generate a cost estimate associated with each of the sellers. The cost estimate may represent an optimized cost to the seller to fulfill the buyer request (e.g., a cost to the seller to provide the good and/or service to the buyer).

In some examples, once the cost estimate has been generated on behalf of a seller, the cost estimate may be provided to the seller for review. For example, rather than providing a current winning bid as in a conventional auction system, the contract negotiation system discussed herein generates and provides a personalized cost estimate to each seller and the option may be given to the seller to at least one of accept, modify, or decline the personalized cost estimate and/or give the system authorization to accept the cost estimate on their behalf without further input. Thus, each seller is unaware of both the personalized cost estimate and the bids of the other sellers.

Upon receiving the personalized cost estimate each seller receives a period of time to accept, modify, or decline the cost estimate. For example, the seller may wish to accept the cost estimate as-is and provide the cost estimate without modification to the buyer for acceptance. Alternatively, the seller may wish to modify the cost estimate based on one or more factors. For example, the seller may wish to increase or decrease the generated cost estimate before providing to the buyer (e.g., the seller may be unable to perform the services or provide the product at the price indicate by the personalized cost estimate). Lastly, the seller may wish to decline the cost estimate. Independent of the actions of the seller with respect to the cost estimate, the accepted, modified, or decline cost estimate may be provided to the buyer. Alternatively, or in addition, the seller may authorize the system to automatically accept the cost estimate on their behalf without further input required.

In further examples, the system may determine whether the number of predetermined bidding rounds has been satisfied. For example, the system may determine, based on the request information and/or the buyer information, that the number of cost estimates provided by each seller (e.g., the number of bidding rounds) that was requested by the seller and/or predetermined by the system, has been satisfied. If the number of bidding rounds has been satisfied, the current cost estimates of each seller (e.g., the current accepted, modified, or declined cost estimate) may be provided to the seller for acceptance. If the number of predetermined bidding rounds has not been satisfied, another bidding round may commence.

In some examples, in the event that another bidding round is required, a second cost estimate may be generated for each seller desiring to fulfill the request. For example, a second cost estimate may be generated for a seller based at least in part on the cost estimates accepted, modified, or declined during the first bidding round. Again, the second cost estimate may be provided to the seller for acceptance, further modification, or to decline. This process may continue until the number of bidding rounds has been satisfied.

In some implementations, the sellers desiring to fulfill the buyer request may be ranked during each bidding round. For example, the system may utilize the request information, buyer information, seller information, and/or third-party information to rank each seller with respect to the other participating sellers. For instance, if the buyer information stipulates a preference for larger companies, a smaller company seller may be ranked lower with respect to larger sellers. The ranking may be provided to the seller along with the cost estimate(s) during each bidding round. In some cases, each seller may only receive the sellers current rank (e.g., tenth out of one hundred sellers). In addition, the ranking may affect the cost estimate that is generated for each seller. For example, if a seller is ranked lower, the cost estimate generated may be lower as the seller may be deemed less desirable (e.g., may require a lower cost estimate to offset other parameters causing the lower ranking).

In some examples, in response to a buyer request, one or more sellers may wish to fulfill only a portion of the request. For example, the buyer may request a large volume of goods to be purchased. In response, one or more buyers may wish to provide only a portion of the volume of good. In this example, the system may generate a cost estimate associated with each seller and the portion of the request the seller wishes to fulfill. In these cases, it is often desirable to have multiple suppliers or sellers and, thus, the offers to fulfill portions of a request may be ranked higher than offers to fulfill an entire request even at a higher price per unit.

Additional details pertaining to the above-mentioned techniques are described below with reference to FIGS. 1-6. It is to be appreciated that while these figures describe example environments and devices that may utilize the claimed techniques, the techniques may apply equally to other environments, devices, and the like.

FIG. 1 illustrates an example environment 100 for automating a third-party contract negotiation, as described herein. As illustrated in FIG. 1, the environment 100 includes a buyer 102 providing a request for a product or service and one or more seller(s) 104 capable of fulfilling at least a portion of the request. As described herein, the buyer 102 may provide request information 106, via a network 108, associated with a request for a product (e.g., goods and/or services) to a third-party contract negotiation system 110. In response to the request information 106, the automated third-party contract negotiation system 110 may conduct one or more bidding rounds during which the seller(s) 104 may be provided one or more personalized cost estimates generated by the third-party contract negotiation system 110 on behalf of the seller(s) 104. It should be understood that, while FIG. 1 depicts one system, automated negotiation system 110, the environment 100 may include any number of systems configured to operate independently and/or in combination and configured to communicate with each other via the network 108. The components of the automated third-party contract negotiation system 110 may be described in detail below.

In examples, the automated third-party contract negotiation system 110 may include one or more processors 112, one or more network interfaces 114, and computer-readable media 116. The computer-readable media 116 may store one or more functional components that are executable by processor(s) 112 such as a buyer data component 118, a request data component 120, a seller data component 122, third-party data component 124, a cost estimate generation component 126, and/or a ranking/scoring component 128. At least some of the components, modules, or instructions of the computer-readable media 116 may be described below.

In examples, the buyer data component 118 may be configured to store and/or access data associated with the buyer 102. For example, the buyer 102 may provide user data, such as buyer information 130, upon accessing the system 110 and/or upon initiating a request for a product from one or more sellers 104 and/or a third-party. For instance, when a buyer 102 accesses the platform of the system 110, the buyer 102 may provide the buyer information 130 regarding the buyer's company, preferences, and the like. For example, the buyer 102 may provide demographic information such as buyer location, size of an associated company, years in operation, and the like.

Alternatively, or in addition, the buyer 102 may provide buyer information 130 including user preferences associated with the buyer 102, future requests, and/or the seller(s) 104. For example, the buyer 102 may stipulate and the buyer information 130 may include preferences regarding future requests and/or the fulfilling seller(s) 104 such as product preferences, seller preferences, and/or platform or system preferences. The product preferences may include product specifications of future requested products, such as production specifications, delivery methods, and the like. The seller preferences may include seller specifications, such as reputation of the seller 104, years in operation of the seller 104, previous number of fulfillments, and the like. The platform or system preferences may include preferences such as notification preferences, settings, and the like.

Still further, the buyer data component 118 may be configured to receive, access, and/or store historical buyer information 130 associated with the buyer 102 and/or additional buyers. For example, the buyer data component 118 may store previous buyer information 130 associated with the buyer 102 and/or other buyers who have utilized the system 110. For instance, the buyer data component 118 may store previous buyer preferences, transaction history, patterns of buyer behavior, and the like. The buyer data component 118 may receive the buyer information 130 and/or may access such information via the network 108. For example, the buyer data component 118 may access an external database of the buyer 102 storing data associated with the buyer 102.

In addition, the computer-readable media 116 may store a request data component 120. The request data component 120 may be configured to receive, access, and/or store request information 132. For example, the buyer 102 may provide the request information 132 upon accessing the system 110 and/or upon initiating a request for a product from one or more sellers 104 and/or a third-party. In some examples, the request information 106 may include information associated with a current request submitted by the buyer 102 to the system 110. For instance, the request information 106 may include information regarding the product requested, such as the number of units, length of services, product requirements, and the like of the goods and/or services requested. In addition, the request information 106 may include user preferences associated with the current request. For example, similar to the buyer information 130, the request information 106 may include preferences associated with the goods requested and/or the seller(s) 104 fulfilling the request. For instance, the request information 106 may include product preferences associated with the requested product, such as preferred quality standards of the product, product specifications, production preferences, and the like. In addition, the request information 106 may include buyer 102 preferences associated with the seller 104, such as a preferred rating of the company by other buyers, age of company, location of the seller(s) 104, etc. The request data component 120 may also be configured to receive, access, and/or store historical request information 106 associated with additional buyers and/or additional negotiation transactions. The request data component 120 may receive such information and/or may access such information via the network 108.

In some examples, the computer-readable media 116 may store a seller data component 122. The seller data component 122 may be configured to receive, access, and/or store seller information 132 provided by the seller 104. The seller 104 may provide user data, such as the seller information 132, upon accessing the system 110 and/or upon initiating a response to fulfill a request for a product from the buyer 102. For example, the seller 104 may provide seller information 132 such as demographic information, company information (e.g., number of employees, location, years of operation, etc.) and/or seller 104 preferences (e.g., platform settings such as frequency of notifications, interface customization settings, authorization to accept cost estimates on the seller's 104 behalf without seller 104 input, etc.). For example, the seller 104 may provide information regarding terms and/or conditions under which the system may accept a bid on their behalf without further input. Alternatively, or in addition, the seller 104 may provide the seller information 132 when the seller 104 first accesses the platform associated with the system 110. For instance, when the seller(s) 104 first become a user of the system 110, the seller(s) 104 may provide the seller information 134.

In addition, the seller data component 122 may be configured to receive, access, and/or store historical seller information 132 associated with the seller(s) 104 and/or previous seller(s) 104 that have utilized the system 110. The seller data component 122 may receive such information and/or may access such information via the network 108. For example, the seller data component 122 may access an external database of the seller(s) 104 storing data associated with the seller(s) 104.

Further, the computer-readable media 116 may store a third-party data component 124. The third-party data component 124 may be configured to receive, access, and/or store the third-party information 134. The third-party information 134 may include data from one or more third-party sources providing such information as market statistics, commodity information, and the like associated with at least one of the buyer, seller, and/or the requested product.

The computer-readable media 116 may further be configured to store a cost estimate generating component 124. The cost estimate generating component 124 may be configured to receive and/or access data from the buyer data component 118, the request data component 120, the seller data component 122, the third-party data component 134, and/or the ranking/scoring component 128 to generate cost estimates for the seller(s) 104. For example, utilizing buyer information 130 from the buyer data component 118, request information 106 from the request data component 120, seller information 132 from the seller data component 122, third-party data 134 from the third-party data component 124, and/or ranking information from the ranking/scoring component 128, the cost estimate generation component 126 may generate cost estimate data 136 to provide to the one or more seller(s) 104. In some examples, the cost estimate data 136 may include an individual cost estimate generated on behalf of a seller 104 wishing to fulfill the request placed by the buyer 102. The cost estimate may indicate a "should cost" amount for the seller 104. In other words, the cost estimate may indicate an expenditure that it should cost the seller 104 to provide the requested good and/or service to the buyer 102 according to the request information 106. As described above, the cost estimate may be based on current and/or historical information associated with the buyer 102, request information 106, and/or seller 104.

In some examples, the cost estimate data 136 may be provided to the seller(s) 104 via the network 108 for review. The cost estimate data 136, including the personalized cost estimates, may be provided to each seller 104 along with an option to at least one of accept, modify, or decline the proposed, generated prenasalized cost estimate. That is, the seller(s) 104 may accept, modify, or decline the cost estimate before submitting a response or offer for acceptance by the buyer 102. Alternatively, or in addition, as described herein, the seller 104 may provide the third-party contract negotiation system 110 authorization to accept the cost estimate on their behalf, without further input. The seller response data 138, including each seller's offer, may be stored within the seller data component 122, and/or the cost estimate generation component 126, for use in generating additional cost estimates for the current negotiation, as well as future negotiations conducted by the system 110.

Should the response data 138 indicate an acceptance of the personalized cost estimate, the response data 138 may be provided to the buyer 102 for consideration during the current round. Should the seller 104 modify the personalized cost estimate, the modified cost estimate may be provided to the buyer 102 as part of the response information 138. Lastly, should the seller 104 decline the cost estimate, the cost estimate may nevertheless be provided for consideration.

As described herein, the request information 132 may stipulate the time period that the seller(s) 104 must accept, modify, or decline the cost estimate. In addition, the request information 106 may stipulate the number of rounds that may take place during the current negotiation. In some examples, the system 110 may automatically determine a time period for response and/or the number of rounds that may take place based on the request information 132, historical information, and/or third-party information (e.g., if the market is volatile, the system 110 may determine that the negotiation process should be expedited). By generating an offer on behalf of the seller(s) 104, in combination with not revealing competing offers to the seller(s) 104, placing a time period for reply, and limiting the number of rounds that may take place, the incentive to place a last minute bid is decreased as the seller(s) 104 have no motivation to place last minute bids in order to have the lowest bid/be chosen. In this way, the system 110 may better allocate and utilize computing resources as the likelihood of an inundation of bids at the same time is decreased (e.g., the seller(s) 104 won't all place last minute bids at the same time, thus overloading the system). As a result, the system 110 resources may achieve better performance.

In additional examples, if the number of rounds has not been satisfied, updated or additional personalized cost estimates may be generated on behalf of the seller(s) 104. For example, the cost estimate generation component 126 may utilize the seller(s) 104 response data during previous bidding rounds of the current negotiation, and/or data from the buyer data component 118, the request data component 120, the seller data component 122, and/or the third-party data component 124, to generate updated cost estimates on behalf of the seller(s) 104. During each round, the seller(s) 104 may again have the option to accept, modify, or decline the generated cost estimate. Once the number of rounds has been satisfied, the offers from each seller 104 may be provided to the buyer 102 for acceptance.

In some examples, the computer-readable media 116 may further be configured to store a ranking/scoring component 128. The ranking/scoring component 128 may be configured to receive and/or access data from the buyer data component 118, the request data component 120, the seller data component 122, the third-party data component 124, and/or the cost estimate generation component 126 to rank the participating seller(s) 104 with respect to one another and/or generate a score associated with the participating seller(s) 104. For example, utilizing buyer information 130 from the buyer data component 118 including current and previous buyer 102 preferences and/or acceptance behavior, the ranking/scoring component 128 may determine that the buyer 102 prefers seller(s) 104 that have been in operation for longer than ten years. Further utilizing the seller information 132 of the seller data component 122, the ranking/scoring component 128 may rank seller(s) 104 in operation for ten years or greater higher than those who have been operating for less than ten years. Additionally, or alternatively, the ranking/scoring component 128 may generate a score associated with the seller(s) 104 indicating a likelihood that the seller 104 will win the bid and/or be selected by the buyer 102. The ranking and/or score may be provided to the buyer 102 in each bidding round along with the respect cost estimates. In addition, the ranking and/or score may affect the cost estimate generation. For example, if a seller 104 is ranked lower with respect to other seller(s) 104 and/or has a low score associated, the cost estimate generation component 126 may take this into account when generating the cost estimate for that particular seller 104. That is, if a seller 104 is ranked lower and/or has a low score associated, the cost estimate generation component 126 may generate a lower cost estimate in order to offset the low-ranking displayed to the buyer 102 and increase the likelihood that the seller 104 may be selected.

As used herein, a processor, such as processor(s) 112, can be a single processing unit or a number of processing units, and can include single or multiple computing units or multiple processing cores. The processor(s) 112 can be implemented as one or more microprocessors, microcomputers, microcontrollers, digital signal processors, central processing units, state machines, logic circuitries, and/or any devices that manipulate signals based on operational instructions. For example, the processor(s) 112 can be one or more hardware processors and/or logic circuits of any suitable type specifically programmed or configured to execute the algorithms and processes described herein. The processor(s) 112 can be configured to fetch and execute computer-readable instructions stored in the computer-readable media 116, which can program the processor(s) 112 to perform the functions described herein.

The computer-readable media 116 may can include volatile and nonvolatile memory and/or removable and non-removable media implemented in any type of technology for storage of information, such as computer-readable instructions, data structures, program modules, or other data. Such computer-readable media 116 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the system 110, the computer-readable media 116 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 116 can be used to store any number of functional components that are executable by the processor(s) 112. In many implementations, these functional components comprise instructions or programs that are executable by the processor(s) 112 and that, when executed, specifically configure the one or more processor(s) 112 to perform the actions attributed above to the service provider and/or payment service.

The network interface(s) 114 may enable wired and/or wireless communications between the components and/or devices shown in environment 100 and/or with one or more other remote systems, as well as other networked devices. For instance, at least some of the network interface(s) 114 may include a personal area network component to enable communications over one or more short-range wireless communication channels. Furthermore, at least some of the network interface(s) 114 may include a wide area network component to enable communication over a wide area network.

Figure 2:
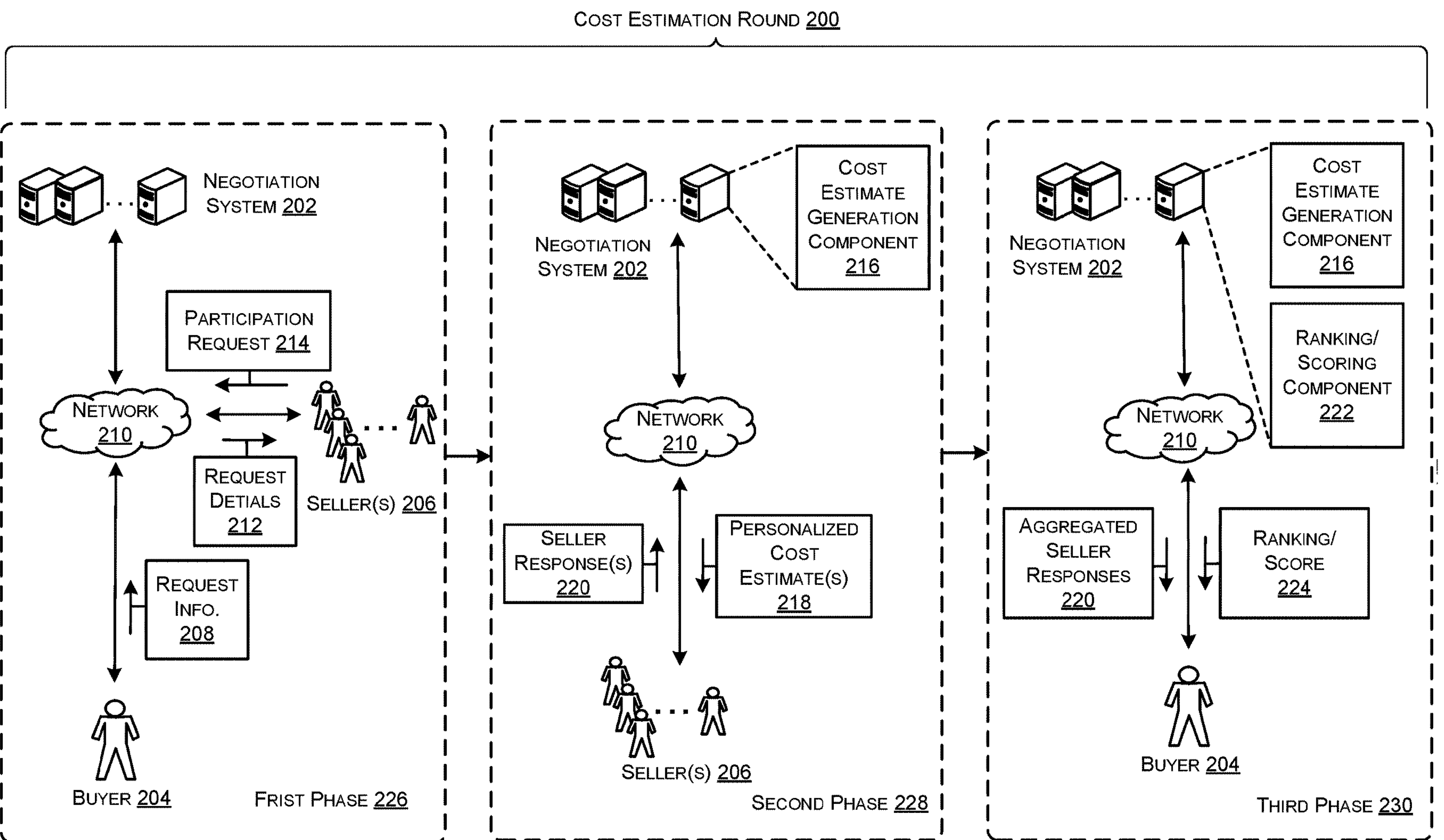
FIG. 2 illustrates an example first round of an automated third-party contract negotiation system according to some implementations.

FIG. 2 illustrates an example cost estimation round 200 of an automated third-party negotiation system, such as system 110 of FIG. 1. During the round 200, an automated third-party negotiation system 202 may accept a request for a product from a buyer 204 for fulfillment by one or more seller(s) 206. In response to the request, the automated third-party negotiation system 202 may generate one or more cost estimates on behalf of the seller(s) 206 for acceptance by the buyer 204. For example, the automated third-party negotiation system 202 may generate a personalized cost estimate 218 for each seller 206. As described herein, one or more rounds may take place during the automated negotiation. The number of rounds may be dictated by request information 208 received from the buyer 204 and/or determined utilizing additional data, such as data received and/or accessed from the seller, third-parties, historical transaction information, and the like.

During a first phase 226 of the round 200, the buyer 204 may provide request data, via the network 210, to the automated negotiation system 202. as described with respect to FIG. 1, the request information 208 may include information associated with a current request submitted by the buyer 204 for a product. For instance, the request information 208 may include information and/or preferences regarding the product requested, such as the number of units, length of services, and/or product specification, production preferences, and the like, of the product requested. In addition, the request information 208 may include buyer 204 preferences associated with the seller(s) 206, such as a preferred rating of the company by other buyers, age of company, location of the seller(s) 206, etc.

In some examples, in response to receiving the request information 208, the automated negotiation system 202 may provide the request details 212 to the seller(s) 206. The request details 212 may be provided via a user interface of a seller 206 device, a user interface of a negotiation platform and/or negotiation application, and the like. For example, the seller(s) 206 may be presented with a user interface displaying all current requests, requests able to be fulfilled by the seller(s) 206, and/or requests associated with a particular buyer 204, and the like. Along with the request, the interface may further provide an option for the seller(s) 206 to place a participation request 214, such as an offer to participate in a negotiation associated with the request details 212. The participation request 214 may be provided, via the network 210, to the automated negotiation system 202.

In examples, in response to the automated negotiation system 202 receiving the participation request 214 from the seller(s) 206 and/or the expiration of a period of time associated with the first phase 226, the round 200 may enter a second phase 228. In the second phase 228, a cost estimate generation component 216 of the automated negotiation system 202 may generate a personalized cost estimate 218 for each seller 206 that has provided a participation request 214 during the first phase 226. As described herein, the cost estimate generation component 216 may utilize buyer information, the request information 208, seller information, and/or third-party data, to generate an initial cost estimate on behalf of the seller 206. In subsequent rounds (not shown), the cost estimate generation component 216 may further utilize previous cost estimate data provided by the seller(s) 206 to generate additional cost estimates on behalf of the seller(s) 206.

The automated third-party negotiation system 202 may then provide the personalized cost estimate(s) 218 to each corresponding seller(s) 206 for review. In response, each seller 206 may submit a seller response 220 to the system 202. For example, the personalized cost estimate(s) 218 may be provided to the seller(s) 206 along with an option to provide a seller response 220 including at least one of acceptance, modification, or declination of the personalized cost estimate 218. For example, the personalized cost estimate 218 may be accepted by the seller 206 without modification. In this instance, the personalized cost estimate 218 may be submitted in the current round 200 as-is for acceptance by the buyer 204. Alternatively, the seller 206 may modify the personalized cost estimate 218 (e.g., increase or decrease the cost estimate). In this instance, the modified cost estimate may be submitted in the current round 200 for acceptance by the buyer 204. Still further, the seller 206 may decline the personalized cost estimate 218. In this instance, while the seller 206 may not be eligible to be chosen by the buyer 204 or to proceed to subsequent rounds.

In some examples, once each of the seller(s) 206 have provided the seller response(s) 220 indicating an acceptance, modification, or declination of the personalized cost estimate 218 and/or the expiration of a period of time associated with the second phase 228, the round 200 may enter a third phase 230. In the third phase 230, aggregated seller responses 220 may be generated by the cost estimate generation component 216 and provided to the buyer 204 for selection of the seller(s) 206 to fulfill the request.

In addition to generating the aggregated seller responses 220, a ranking/scoring component 222 of the automated negotiation system 202 may utilize the request information 208 and/or additional buyer 204 information (e.g., buyer preferences, buyer demographic information, past buy behavior, etc.) to generate a ranking/scoring 224 associated with the one or more seller(s) 206. For example, if the request information 208 stipulates that the buyer 204 prefers seller(s) 206 located within a certain distance of the buyer 204, the automated negotiation system 202 may rank seller(s) 206 located within the preferred distance higher than other seller(s) 206 located outside of the preferred distance. In other examples, the ranking/scoring component 222 may generate a score associated with the seller(s) 206. For example, a seller 206 located within the preferred distance may receive a high score, indicating a high likelihood of selection. The ranking/scoring 224 may be provided along with the aggregated cost estimates 220 to the buyer 204. Once the buyer 204 has received the aggregated seller responses 220 and the ranking/scoring 224, the buyer 204 may choose a seller for fulfillment of the request. The identity of the chosen seller 206 may be provided to the automated negotiation system 202 and the chosen seller 206 may be notified. In other implementations, the system 202 may select the seller 206 for fulfillment of the request based on the ranking/scoring 224 and provide the identity 232 of the selected seller 206 to the buyer 204 and the notification of the selection to the chosen seller 206.

FIG. 2 illustrates a negotiation with a single round 200. However, as described herein, the number of rounds may vary according to one or more factors (e.g., the request information 208, seller information, historical information, market information, etc.) and more than one bidding round may be conducted. In instances with multiple rounds, the first phase 226 and the second phase 228 may followed by a subsequent round rather than a seller being selected and the system 202 proceeding to the third phase 230. An example, of a subsequent round of a negotiation is illustrated below with respect to FIG. 3.

Figure 3:
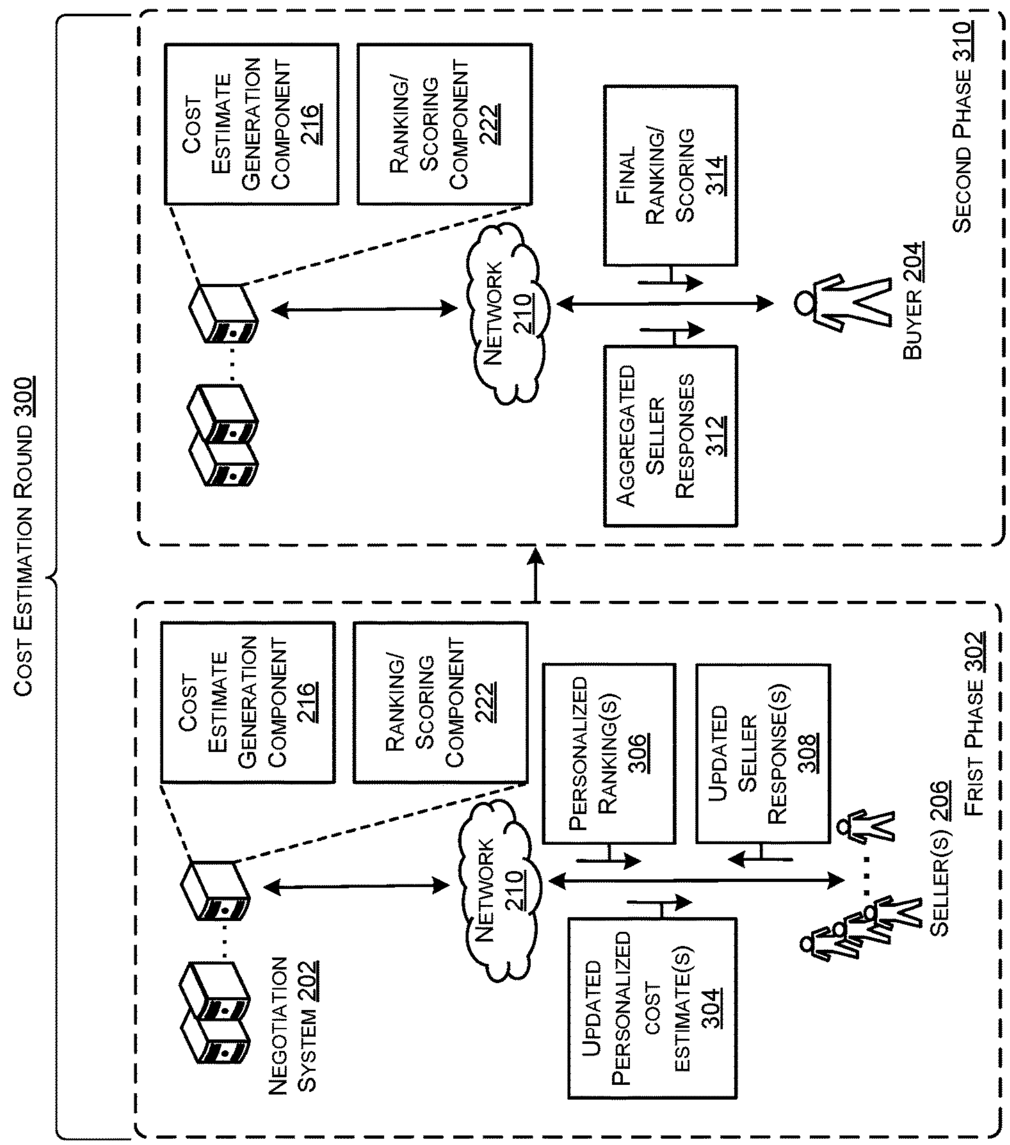
FIG. 3 illustrates an example subsequent round of an automated third-party contract negotiation system according to some implementations.

FIG. 3 illustrates an example subsequent round 300 following the first round 200, described above, of an automated third-party contract negotiation system 202. In the illustrated example, upon the completion of the second phase 228 of the first round 200, the system 202 initiates the second round 300 described below.

In this example, once the system 202 receives a seller response 220 from each seller 206 indicating an acceptance, modification, or declination of the personalized cost estimate 218 and/or the expiration of a period of time associated with the second phase 228, the round 200 may enter the first phase 302 of the second cost estimation round 300. In the first phase 302, the ranking/scoring component 222 of the automated negotiation system 202 may utilize the request information 208 and/or additional buyer 204 information (e.g., buyer preferences, buyer demographic information, past buy behavior, etc.) to generate the ranking/scoring 224 of the one or more seller(s) 206. For example, if the request information 208 stipulates that the buyer 204 prefers seller(s) 206 located within a certain distance of the buyer 204, the automated negotiation system 202 may rank seller(s) 206 located within the preferred distance higher than other seller(s) 206 located outside of the preferred distance.

During the first phase 302 of the second round 300, the cost estimate generation component 216 of the system 202 may also generate an updated personalized cost estimate 304 for each seller 206. In the second round 300, the cost estimate generation component 216 may utilize buyer information, the request information 208, seller information, the third-party data, as well as the ranking/scoring 224 and/or the seller responses 220 to generate an updated cost estimates 304 on behalf of each seller 206. In the illustrated example, the updated personalized cost estimate 304 and a personalized ranking 306 (e.g., each seller 206 may be provided with their rank but not with the identity or rank of the other sellers 206) may be provided to each seller 206. Alternatively, each seller 206 may be provided with the full ranking/scoring 224 associated with the previous round.

Each seller(s) 206 may in response to receiving the updated personalized cost estimate 304 and/or the personalized ranking 306, provided the system 202 with an updated seller response 310 indicating an acceptance, modification, or declination of the updated personalized cost estimate 304. For example, the updated personalized cost estimate 304 may be again be accepted by the seller 206 without modification, modified (e.g., increase or decrease the cost estimate) by the seller 206, or declined by the seller 206.

Once the updated seller response 308 is received from each seller 206 and/or the expiration of a period of time associated with the first phase 302, another subsequent round (not shown) may commence and/or the current round 300 may enter a second phase 310 when the current round 300 is the final round. In the second phase 310, the system 202 may aggregate the current seller responses 308 and provided the aggregated seller responses 312 to the buyer 204 for selection of the seller(s) 206 to fulfill the request.

In addition to generating the aggregated seller responses 312, the system 202 may generate a final ranking/scoring 314 based at least in part on the request information 208 and/or additional buyer 204 information (e.g., buyer preferences, buyer demographic information, past buy behavior, etc.) and/or the aggregated seller responses 312. The final ranking/scoring 314 may be provided along with the aggregated seller responses 312 to the buyer 204. Once the buyer 204 has received the seller responses 312 and the final ranking/scoring 314, the buyer 204 may choose a seller for fulfillment of the request. The identity of the chosen seller may be provided to the automated negotiation system 202 and the chosen seller 206 may be notified.

Figure 4:
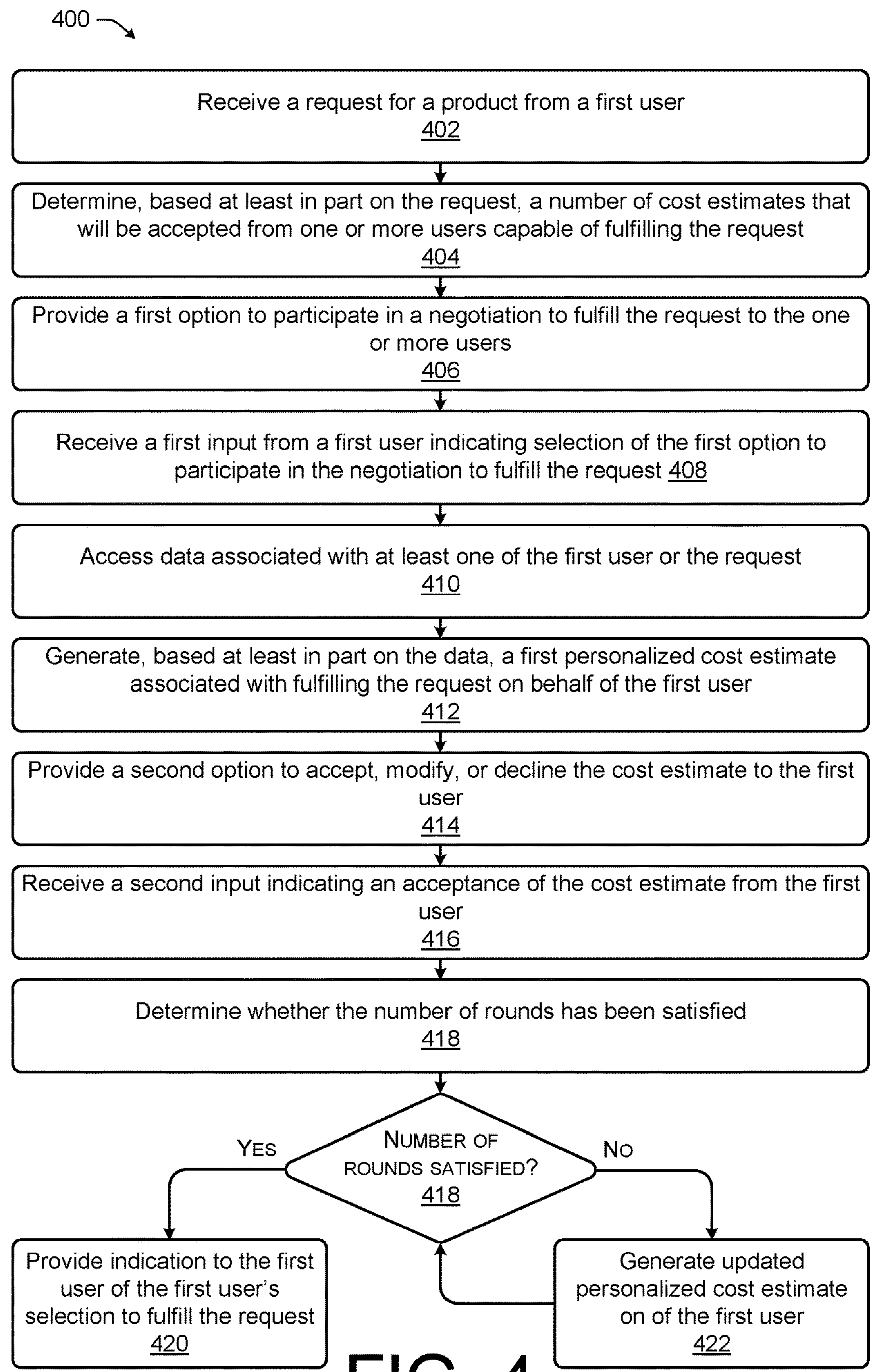
FIG. 4 illustrates a flow diagram of an example process for automating third-party contract negotiations according to some implementations.
Figure 5:
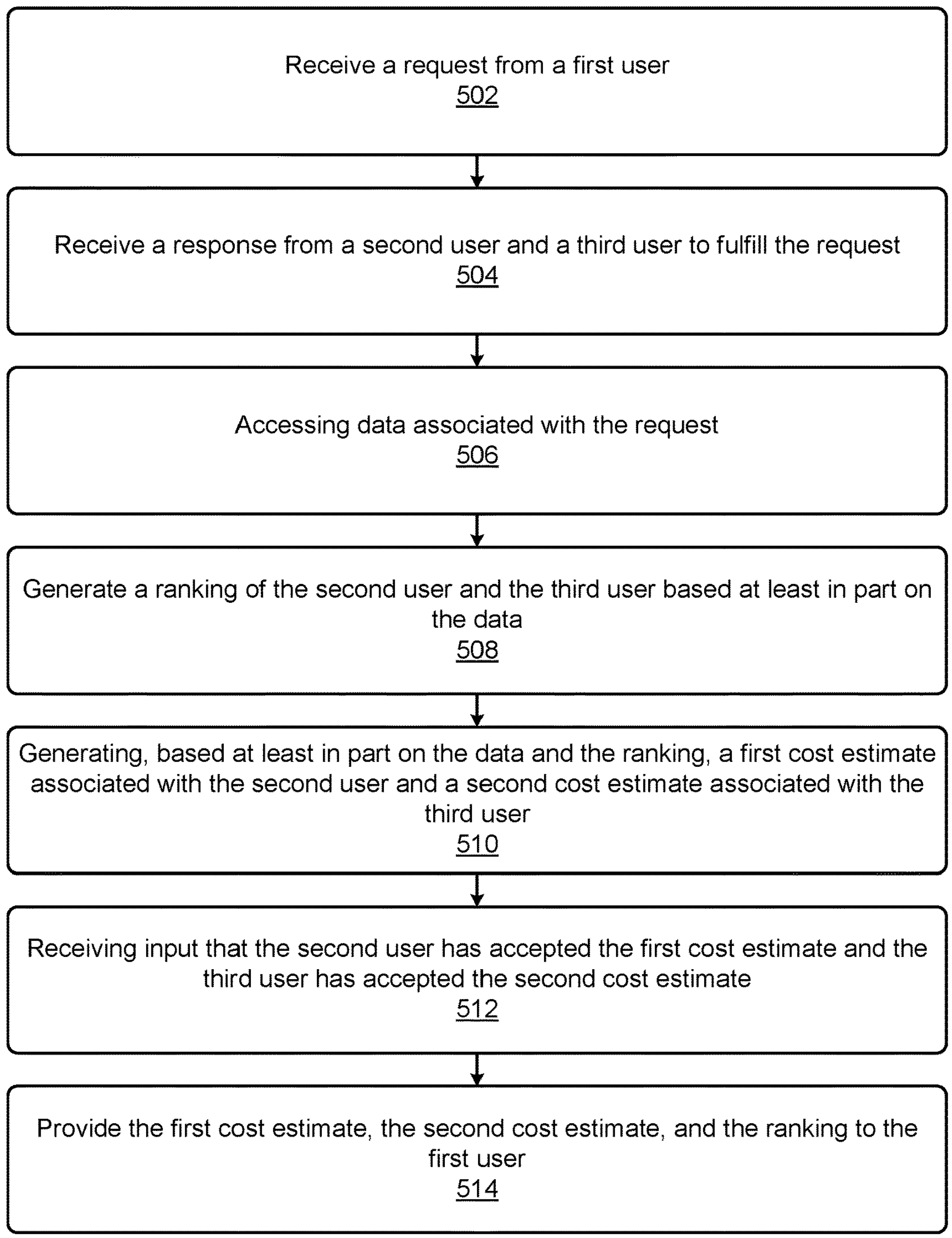
FIG. 5 illustrates a flow diagram of an example process for automating third-party contract negotiations according to some implementations.
Figure 6:
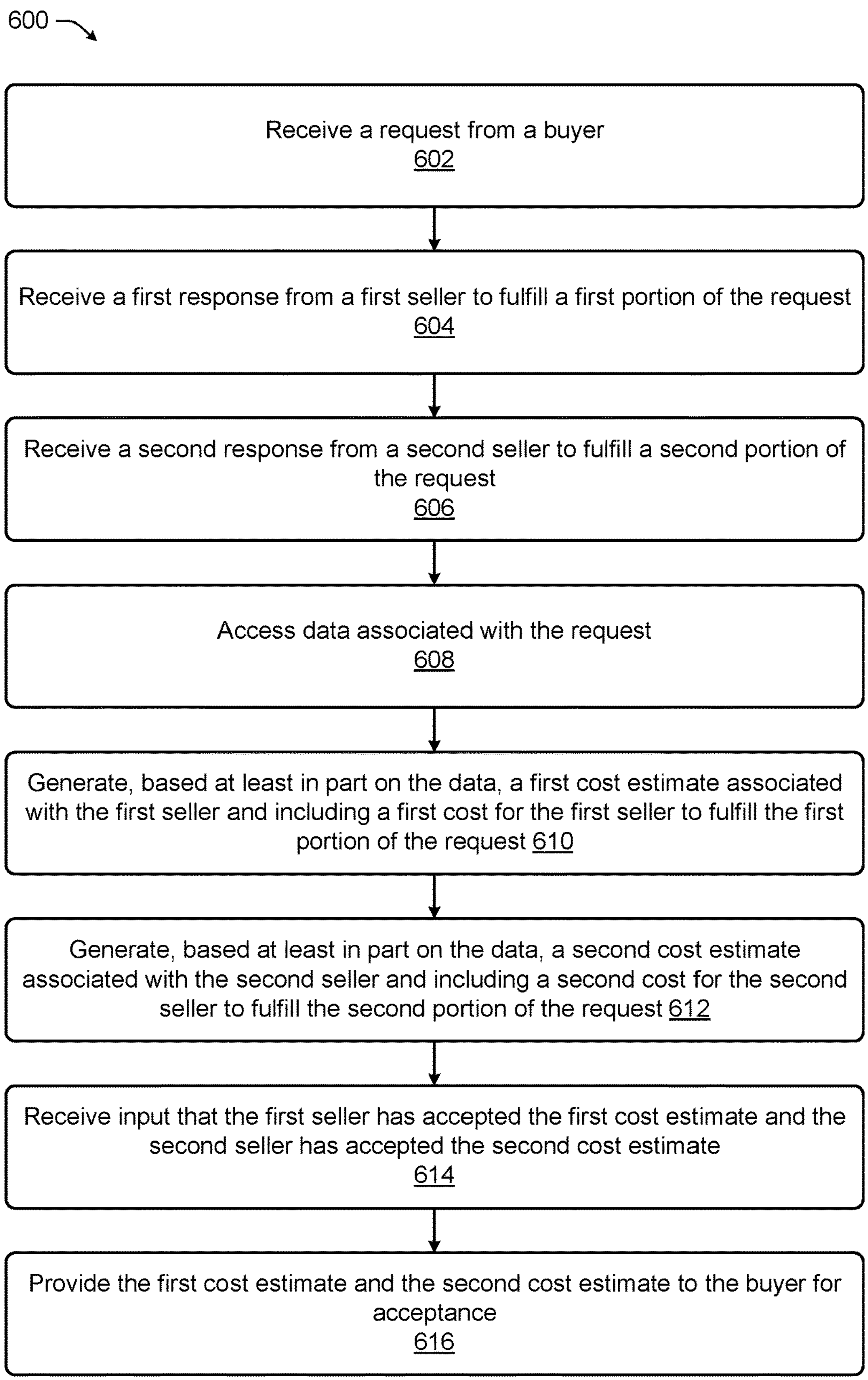
FIG. 6 illustrates a flow diagram of an example process for automating third-party contract negotiations according to some implementations.

FIGS. 4-6 illustrate various flow diagrams of example processes for batch-processing customer tabs in response to an event, as described herein. The processes illustrated in FIGS. 4-6 are described with reference to FIGS. 1-3 2, for convenience and ease of understanding. However, the processes illustrated in FIGS. 4-6 are not limited to being performed using components described in FIGS. 1 and 2, and such components are not limited to performing the processes illustrated in FIGS. 4-6.

The processes 400, 500, and 600 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes 300, 400, and 500 can be combined in whole or in part with each other or with other processes.

FIG. 4 illustrates an example process 400 for automating a third-party negotiation. In some examples, operations described below can be performed by a system including local computing device(s) and/or remote computing device(s) that are in communication with the local computing device(s) (e.g., in a distributed configuration).

At operation 402, the system may receive a request for a product from a first user. As described herein, a first user, such as a buyer, may submit a request to the automated negotiation system for a product, such as a good and/or service. The request may include request information such as information associated with the product, buyer information, and the like. For example, the request may include information regarding buyer preferences with regard to the requested product, preferred seller characteristics, basic buyer information (e.g., demographic information), and the like.

At operation 404, the system may determine, based at least in part on the request, a number of cost estimates that may be accepted from one or more user capable of fulfilling the request. As described herein, the request information may include buyer preferences with regard to the number of bidding rounds that may take place during the negotiation (e.g., a number of cost estimates that may be accepted from each of the sellers). Alternatively, or in addition, the automated negotiation system may determine, based on the request information and/or other data (e.g., seller information, third-party information such as market information, commodity information, etc.), a number of rounds that may take place during the negotiation. For example, the buyer may wish to have a limited number of rounds based on the time frame for needing the product. In other examples, based on the product requested and the volatility of the market for the product, the system may determine that a limited number of bidding rounds should take place to accommodate market considerations.

At operation 406, the system may provide a first option to participate in a negotiation to fulfill the request to the one or more users. As described herein, an indication of the request may be provided to one or more users of the system, such as the one or more sellers. The indication may include information associated with the request, such as a number of products request, timeline for providing the products, and the like, and an option to fulfill the request. That is, the system may provide the request information along with an option to participate in the negotiation.

At operation 408, the system may receive a first input from a first user indicating selection of the first option to participate. For example, as described herein, the automated negotiation system may receive selection information from the seller indicating that the seller would like to fulfill the request of the buyer.

At operation 410, the system may access data associated with at least one of the first user, the second user, or the request. For example, the one or more components of the automated negotiation system, as described herein, may access, receive, and or store information associated with buyer(s), seller(s), and/or request(s). In some examples, the one or more components may additional access data associated with previous transactions and/or third-party data. The automated negotiation system may access and utilize various data from these sources, related to the current request (e.g., the same buyer, same seller, similar product, similar transactions, etc.). For example, one or more components of the automated negotiation system may access third-party data related to the current market and/or commodity statistics of the requested product. In other examples, the one or more components may access, from a buyer data component, information regarding historical behavior of the buyer (e.g., past selection, user preferences, etc.).

At operation 412, the system may generate, based at least in part on the data, a personalized cost estimate associated with fulfilling the request on behalf of the first user. As described herein, utilizing the data accessed at operation 310, the automated negotiation system may generate a cost estimate on behalf of the first user, or seller. The cost estimate may indicate a cost associated with the seller to fulfill the request of the buyer. For example, the cost estimate may indicate a "should cost value," or a value it should cost the seller to fulfill the request. The cost estimate may represent an optimized value determined on behalf of the seller.

At operation 414, the system may provide a second option to accept, modify, or decline the cost estimate to the first user. As described herein, the second option may include the personalized cost estimate. In some cases, the second option may enable the first user to accept, modify, or decline the cost estimate. If the first user chooses to accept or decline the cost estimate, the cost estimate as-is, is provided to the buyer for consideration. If the seller chooses to modify the cost estimate, the modified cost estimate is provided to the buyer for consideration.

At operation 416, the system may receive a second input indicating an acceptance of the cost estimate. As described herein, the first user, or seller, may choose to accept the cost estimate as-is. In this instance, the generated cost estimate is provided to the buyer for consideration without modification.

At operation 418, the system may determine whether the number of rounds has been satisfied. As described herein, request information, and/or one or more other sources of data, may be utilized at operation 404 to determine a number of rounds that may take place.

If it is determined that the number of rounds has been satisfied, then at operation 420, the system may provide the first user with an indication of the first user's selection to fulfill the request. As described herein, the buyer may receive the cost estimate information generated on behalf of the seller and accepted without modification. The buyer may receive additional information (e.g., seller information, ranking information, etc.) along with the cost estimate. Once received, the buyer may choose to accept first user from among the other users to fulfill the request.

If, however, the system determines that the number of rounds has not been satisfied, then at operation 422, a system may generate an updated cost estimate on behalf of the first user. As described herein, if the number of rounds has not been reached, the process may repeat itself, with a new or updated cost estimate generated on behalf of the first user, and the other users, at each round. In some examples, in rounds subsequent to the first round, the automated negotiation system may utilize cost estimate information and/or seller responses (e.g., the cost estimates accepted, modified, or declined by the seller) to generate the subsequent cost estimates for each seller. Once the number of rounds has been satisfied, the final cost estimates for each seller may be provided to the buyer for acceptance and selection, as discussed above.

While the process 400, is described with respect to a first user, it should be understood that nay number of users, or sellers, may interact with the system in the manner discussed with respect to the first user until, one of the users is selected to fulfill the request.

FIG. 5 illustrates another example process 500 for automating a third-party negotiation. The process 400 of FIG. 4, discussed above, illustrates a negotiation having multiple rounds. However, the current process 500 illustrates an example in which the negotiation is concluded within a single round. At operation 502, the system may receive a request from a first user. As described herein, a first user, such as a buyer, may submit a request to the automated negotiation system for a product, such as a good and/or service. The request may include request information such as information associated with the product, buyer information, and the like. For example, the request may include information regarding buyer preferences with regard to the requested product, preferred seller characteristics, basic buyer information (e.g., demographic information), and the like.

At operation 504, the system may receive a response from a second user and a third user to fulfill the request. For example, as described herein, one or more sellers, or the second and third user, may be provided with the request from the seller. The second and third user may be provided with request information and may provide an input to the automated negotiation system indicating selection of an option to participate in a negotiation to fulfill the request. For example, as described herein, the automated negotiation system may receive selection information from the sellers indicating that the sellers would like to place a bid to fulfill the request of the buyer.

At operation 506, the system may access data associated with the request. For example, the one or more components of the automated negotiation system, as described herein, may access, receive, and or store information associated with the request. In some examples, the one or more components may additional access data associated with the buyer(s), seller(s), previous transactions and/or third-party data. For example, the automated negotiation system may access and utilize various historical data related to the current request (e.g., the same buyer, same seller, similar product, similar transactions, etc.). In additional examples, the one or more components of the automated negotiation system may access third-party data related to the current market and/or commodity statistics of the requested product.

At operation 508, the system may generate a ranking of the second use and the third user based at least in part on the data. As described herein, the automated negotiation system may generate a ranking of the sellers based at least in part on the data. For example, if the buyer preferences indicate that the buyer prefers local sellers, the system may rank local sellers higher than non-local sellers. In addition, if the seller information indicates that the second user provides products that do not meet the specifications indicated in the request information, the second user may be ranked lower than the third user.

At operation 510, the system may generate, based at least in part on the data and the ranking, a first cost estimate associated with the second user and a second cost estimate associated with the third user. In this manner, each user, such as the first and second users, may receive a personalized or unique cost estimate associated with fulfilling the request. In some cases, the system may generate the first and second cost estimate based on the data accessed at operation 506, along with the ranking information generated at operation 508. The cost estimates may indicate individual costs associated with each seller to fulfill the request of the buyer. For example, the cost estimate may indicate a "should cost value," or a value it should cost each seller to fulfill the request. The cost estimate may represent an optimized value determined by the system on behalf of each seller. In addition, the cost estimate may be generated utilizing the ranking information generated at operation 508. For example, if the second user is ranked lower than the third user due to other parameters (such as distance, years in business, etc.), the system may generate a lower cost estimate for the second user than the cost estimate for the first user to compensate for the lower ranking and, thereby, increase the likelihood that the buyer may select the second user over the first.

At operation 512, the system may receive an input indicating that the second user has accepted the first cost estimate and the third user has accepted the second cost estimate. As described herein, each seller may choose to accept the cost estimate as-is. In this instance, each generated cost estimate is accepted in the current bidding round and submitted for consideration.

At operation 514, the system may provide the first cost estimate, the second cost estimate, and the ranking to the first user. As described herein, at the conclusion of the final bidding round (in this instance, the first round), the accepted cost estimates of each seller received at operation 512, along with the ranking information generated at operation 508, are provided to the buyer for selection.

FIG. 6 illustrates another example process 600 for automating a third-party negotiation. In some cases, it may be desirable to have multiple sellers each fulfill a portion of the request. For example, having multiple sellers may mitigate risk that a particular seller is unable to fulfill the portion of the request (e.g., due to acts of nature, bankruptcy, supply issues, employee issues, etc.). Thus, in the current example, the system may select multiple sellers may to each perform a fulfill a portion of the request.

At operation 602, the system may receive a request for a product from a buyer. As described herein a buyer may submit a request to the automated negotiation system for a product, such as a good and/or service. The request may include request information such as information associated with the product, buyer information, and the like. For example, the request may include information regarding buyer preferences with regard to the requested product, buyer demographics, preferred seller characteristics, and the like. In this example, the request may include an indication that the request may be fulfilled in multiple portions, such as the first portion and second portion discussed below.

At operation 604, the system may receive a response from a first seller to fulfill the first portion of the request. For example, as described herein, the first seller may be provided with an indication of the request from the seller. The indication may include the request and other information related to the request, such as the volume of products requested, the fulfillment timeline, and the like. The request information may also include an option to fulfill only a portion of the request (e.g., place a bid for consideration by the buyer). For example, the first seller may provide an input to the automated negotiation system indicating a desire to place a bid to fulfill a certain portion of the request. The first response input may include exact specifications associated with the fulfillment, such as exact the portion of the product that the first seller is wishes to provide. In some cases, the first user may indicate the volume, amount, quantity, or otherwise the size of the portion that the first user desires to fulfill. In other example, the size of the first portion may be predetermined by the buyer as part of submitting the request and/or by the system in sending the request information to the sellers.

At operation 606, the system may receive a response from a second seller to fulfill a second portion of the request. For example, as described herein, a second seller may be provided with an indication of the request from the seller. The second seller may provide an input to the automated negotiation system indicating a desire to place a bid to fulfill only a certain portion of the request. Again, the second user may indicate the volume, amount, quantity, or otherwise the size of the portion that the second user desires to fulfill. In other examples, the size of the second portion may be designated and/or predetermined by the buyer as part of submitting the request and/or by the system in sending the request information to the sellers.

At operation 608, the system may access data associated with the request. For example, the one or more components of the automated negotiation system, as described herein, may access, receive, and or store information associated with the request. In some examples, the one or more components may additional access data associated with the buyer(s), seller(s), previous transactions and/or third-party data.

At operation 610, the system may generate a first cost estimate associated with the first seller and including a first recommended cost for the first seller to fulfill the first portion of the request. As described herein, utilizing the data accessed at operation 608, the automated negotiation system may generate the cost estimate on behalf of the first seller for providing the first portion of the request.

At operation 612, the system may generate a second cost estimate associated with the second seller and including a second recommended cost for the second seller to fulfill the second portion of the request. As described herein, utilizing the data accessed at operation 608, the automated negotiation system may generate a cost estimate on behalf of the second seller for providing the first portion of the request. In traditional auction environments, sellers may be inclined to charge more for lower volumes of product and charge less for higher volumes of product (e.g., provide a discount for larger orders). In these conventional settings, unlike the current system, the bids provided by each seller may not be optimized when fulfilling only a portion of the requested product.

For example, by utilizing multiple data sources, including historical data, the automated negotiation system may optimize each bid for each seller wishing to fulfill a portion of the request. In this way, the seller does not have to manually calculate the advantages/disadvantages and/or cost inefficiencies with providing partial volumes of the requested product. In addition, multiple negotiations do not have to be conducted for each portion of the requested product. Multiple sellers may bid on partial fulfillment of the same request at the same time, with each cost estimate generated taking into account the additional sellers wishing to provide the remaining volume of requested product. This may result in an automated negotiation system utilizing less system resources to conduct multiple negotiations and optimizing each partial fulfillment offer with respect to the remaining fulfillment offers.

In some cases, the system may generate personalized cost estimates for each seller that include a cost estimate for fulfilling each portion of the request individually, a subset of the portions of the request, and/or the entire request. In some cases, the system may also recommend predetermined portions or volumes each seller may wish to fulfill by providing cost estimates for each predetermined portion. In some cases, the system may determine the size of the predetermined portion based on historical data associated with each seller, buyer data, current seller data, other seller data, etc.

At operation 614, the system may receive input indicating that a seller, such as the first seller, has accepted the first cost estimate and a seller, such as the second seller, has accepted the second cost estimate. As described herein, each seller may choose to accept the cost estimate as-is. In this instance, each generated cost estimate is accepted in the current bidding round and submitted for consideration.

At operation 616, the system may provide the first cost estimate and the second cost estimate to the first user for acceptance. As described herein, at the conclusion of the final bidding round (in this instance, the first bidding round), the accepted cost estimates of each seller for each portion of the request, received at operation 514, are provided to the buyer for selection.

Figure 7:
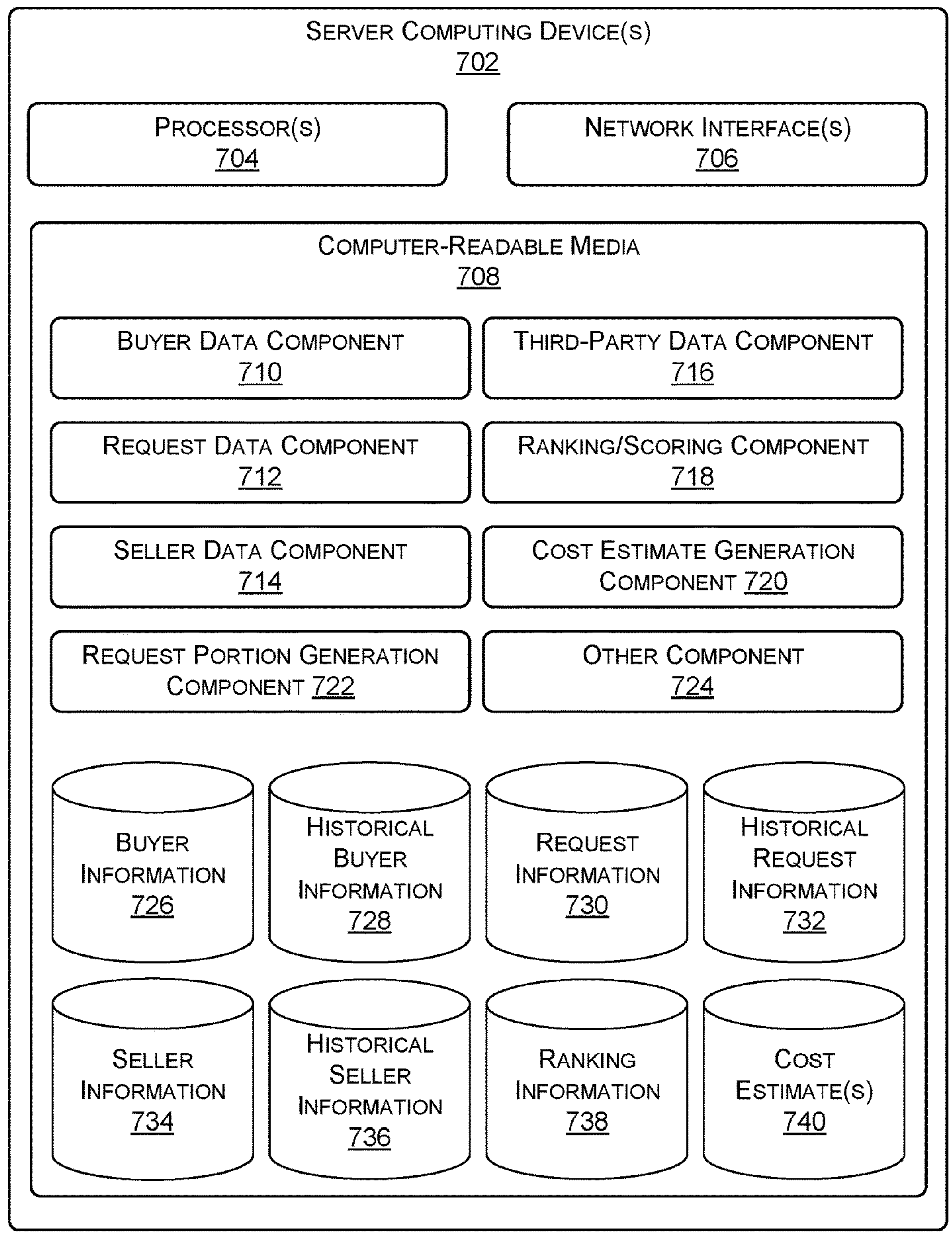
FIG. 7 illustrates an example server computing device that may be used for automating third-party contract negotiations according to some implementations.

FIG. 7 illustrates an example server computing device 702 for performing techniques as described herein. As described herein, one or more user computing devices can communicate with one or more intermediary computing devices, such as the automated negotiation system 700 described herein. The server computing device(s) 702 ("server(s)" hereinafter) can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 702 as being present in a single location, these components and data can alternatively be distributed across different computing devices and different locations in any manner. In some examples, such components and data can be distributed across user computing devices, as described herein. The functions can be implemented by one or more server computing devices, with the various functionality described above distributed in various ways across the different computing devices. Multiple server(s) 702 can be located together or separately, and organized, for example, as virtual servers, server banks and/or server farms.

In some examples, the server(s) 702 may perform the same or similar functions as the automated negotiation system described in FIGS. 1-6. The server(s) 702 may comprise processor(s) 704 that are operatively connected to network interface(s) 706 and a computer-readable media 708. Each processor 704 can be a single processing unit or a number of processing units and can include single or multiple computing units or multiple processing cores. The processor(s) 704 can be implemented as one or more microprocessors, microcomputers, microcontrollers, digital signal processors, central processing units, state machines, logic circuitries, and/or any devices that manipulate signals based on operational instructions. For example, the processor(s) 704 can be one or more hardware processors and/or logic circuits of any suitable type specifically programmed or configured to execute the algorithms and processes described herein. The processor(s) 704 can be configured to fetch and execute computer-readable instructions stored in the computer-readable media 708, which can program the processor(s) 704 to perform the functions described herein.

The computer-readable media 708 can include volatile and nonvolatile memory and/or removable and non-removable media implemented in any type of technology for storage of information, such as computer-readable instructions, data structures, program modules, or other data. Such computer-readable media 706 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 702, the computer-readable media 708 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 708 can be used to store any number of functional components that are executable by the processor(s) 704. In many implementations, these functional components comprise instructions or programs that are executable by the processor(s) 704 and that, when executed, specifically configure the one or more processors 704 to perform the actions attributed above to the automated negotiation system. Functional components stored in the computer-readable media 708 can include a buyer data component 710, request data component 712, seller data component 714, third-party data component 716, ranking/scoring component 718, a cost estimate generation component 720, a request portion generation component 722, as well as other component(s) 724. The computer-readable media 708 may also store buyer information 726, historical buyer information 728, request information 730, historical request information 732, seller information 734, historical seller information 736, ranking information 738, and/or cost estimate(s) 740.

In examples, the computer-readable media 708 may include the buyer data component 710. The buyer data component may be configured to receive, access, and/or store buyer information 726 and/or historical buyer information 728. The buyer data component 710 may be configured to receive, access, and/or store data associated with a buyer. For example, the buyer data component 710 may be configured to access a buyer database associated with the buyer and storing buyer information 726 such as information regarding buyer operations, a company associated with the buyer, and the like. As another example, the buyer data component 710 may also be configured to receive the buyer information 726 directly from the buyer. For example, when the buyer is initiating a transaction with the automated negotiation system 700, the buyer may provide basic information, such as address, number of employees, buyer preference, and the like, that may be stored in association with a buyer profile or directly in the buyer data component 710. The buyer information 726 may include buyer preferences with regard to user interface settings, notification preferences, negotiation preference (e.g., a number of bidding rounds to be conducted for a current or future negotiation, etc.), seller preferences, and the like. The buyer data component 710 may be configured to access and/or receive such data via the network interface 706 of the server computing device 702.

The buyer data component 710 may be further be configured to receive, access, and/or store historical buyer information 728 associated with the buyer. For example, the buyer data component 710 may access a database associated with the buyer and storing the historical buyer information 728 associated with past behavior of the buyer, past negotiation selections, past negotiation preferences, and the like. In addition, the buyer may provide the historical buyer information 728 directly to the buyer data component 710. For example, upon initiating a transaction or request, the buyer may provide past negotiation preferences, past seller deals, and the like.

In examples, the computer-readable media 708 may further include a request data component 712. The request data component 712 may be configured to receive, access, and/or store request information 730 and/or historical request information 732. The request information 730 may include current request information provided by the buyer upon initiating a transaction with the automated negotiation system. For example, the buyer may provide request information including, but not limited to, a volume of goods and/or services requested, a timeline requested for providing the requested goods and/or services, negotiation preferences (e.g., a number of bidding rounds that may be accepted, a time period for responding to the generated cost estimates by the seller, etc.), and the like. Alternatively, or in addition, as described herein, the automated negotiation system 700 may utilize the request information 730, along with data associated with at least one of the buyer, seller, third-party data, and the like, to determine the negotiation preferences.

In addition, the request data component 712 may further be configured to access, received, and/or store historical request information 732. The historical request information 732 may include request information associated with previous transactions conducted via the automated negotiation system 700. The historical request information 732 may include request information associated with previous transactions associated with one or more buyers that have utilized the automated negotiation system 700. The historical request information 732 may include a volume of goods and/or services requested, a timeline requested for providing the requested goods and/or services, negotiation preferences, and the like, stipulated by users in previous transactions. The request data component 712 may be configured to access and/or receive such data via the network interface 706 of the server computing device 702.

Further, the memory may include a seller data component 714. The seller data component 714 may be configured to access, request, and/or store seller information 734 and/or historical seller information 736. The seller data component 714 may be configured to receive, access, and/or store data associated with a seller. For example, the seller data component 714 may be configured to access a seller database associated with the seller and storing seller information 734, such as information regarding seller operations, company information associated with the seller (e.g., a size of the company, a location of the company, products provided, etc.), and the like. As another example, the seller data component 714 may also be configured to receive the seller information 734 directly from the seller. For example, when the seller is initiating an interaction with the automated negotiation system 700, the seller may provide information, such as an address, number of employees, products provided, and the like, that may be stored in association with a seller profile or directly in the seller data component 714. The seller data component 714 may be configured to access and/or receive such data via the network interface 706 of the server computing device 702.

The seller data component 714 may be further be configured to receive, access, and/or store historical seller information 732 associated with the seller. For example, the seller data component 714 may access a database associated with the seller and storing the historical seller information 736 associated with past behavior of the seller, past negotiation behaviors (e.g., modification of cost estimates provided, timeliness of responding to cost estimates, timeliness of fulfilling the request, etc.), past negotiation preferences, and the like. In addition, the seller may provide the historical seller information 736 directly to the seller data component 714.

In examples, the computer-readable media 708 may further include a third-party data component 716. The third-party data component 716 may be configured to access and/or receive data associated with various third-party information providers. For example, the third-party data component 716 may be configured to access market information associated with a requested product, commodity patterns associated with a product, seller/buyer reviews, and the like.

The computer-readable media 708 may further include a ranking/scoring component 718. The ranking/scoring component 718 may store ranking information 738. The ranking/scoring component 718 may be configured to determine a ranking of one or more sellers with respect to each other and/or a score associated with one or more sellers per round of a negotiation. For example, the ranking/scoring component 718 may be configured to access and/or receive data from at least one of the buyer data component 710, the request data component 712, the seller data component 714, and/or the third-party data component 716 to generate the ranking information 738 associated with the one or more sellers. For example, the ranking/scoring component 718 may receive request information 730 from the request data component 712, buyer information 726 and historical buyer information 728 from the buyer data component 710, along with seller information 734 and historical seller information 736 from the seller data component 714. In an example, the request information 730 and/or the buyer information 726 and historical buyer information 728 may indicate that the buyer prefers merchants that are located within a certain distance of the buyer. In addition, the seller information 734 and historical seller information 736 may indicate that an address of the seller(s). Utilizing the request information 730 and the seller information 730, the ranking/scoring component 718 may rank each seller according to a threshold distance from a location of the buyer, with sellers located outside of the threshold distance being ranked lower. The ranking information 738 may be provided to the buyer. Additionally, or alternatively, the ranking/scoring component 718 may utilize the request information 730 and the seller information 730 to determine a score associated with each seller indicating a likelihood of selection by the seller and/or the likelihood that the seller will win the bid. For example, sellers located outside of the threshold distance may receive a low score. In some examples, the scoring capacity of the system may be utilized in instances where there is a single seller.

The computer-readable media 708 may further include a cost estimate generation component 720. The cost estimate generation component 720 may include a cost estimate generation component 720. The cost estimate generation component 720 may be configured to generate cost estimate(s) 740 associated with each seller participating in a round. For example, as described herein, when a seller decides to participate in a round to compete for fulfillment of the seller request, the cost estimate generation component 720 may access and/or receive data associated with the request. For example, the cost estimate generation component 720 may access and/or receive data from at least one of the buyer data component 710, the request data component 712, the seller data component 714, the third-party data component 716, and/or the ranking/scoring component 718. The cost estimate generation component 720 may utilize some, or all, of this data to generate a cost estimate associated with each seller and indicating a value that it should cost the seller to fulfill the seller request.

For example, the cost estimate generation component 720 may utilize request information 730 indicating a volume of goods requested, along with seller information 734 indicating the volume of goods each seller is capable of providing, to generate the cost estimate for each seller. In additional examples, the cost estimate generation component 720 may utilize request information 730 indicating a seller preference for a quick turnaround, along with seller information 734 indicating the size of each seller's production facility, to generate the cost estimate.

In still further examples, the cost estimate generation component 720 may utilize ranking information 738 when generating the cost estimate for a seller. For example, the buyer information 726 or the historical buyer information 728 may indicate a preference for older companies, while with seller information 734 indicates that a particular seller is a newly formed company. This information may result in the ranking/scoring component 718 generating low ranking information 738 in association with the seller. Utilizing this ranking information, along with the request information 730 and seller information 734, the cost estimate generation component 720 may generate a lower personalized cost estimate for this particular seller. In this way, the cost estimate is optimized to increase the likelihood that the cost estimate is competitive, in light of the seller preferences and low seller ranking and increase the likelihood that the seller may be selected.

In some examples, a seller may wish to only fulfill a portion of the request. As described herein, in this instance, the cost estimate generation component 720 may provide a cost estimate to each seller according to the portion they wish to fulfill. In this way, multiple negotiations are unnecessary, and cost estimates for each portion may be determined and presented to the seller within a single negotiation. This may help eliminate costly resource expenditures associated with conducting multiple negotiations, as well as prevent unoptimized bids when each portion is bid for in separate negotiations. That is, the techniques described herein generate cost estimates taking into account each portion that each seller wishes to fulfill, thereby optimizing the bidding process for the full request.

In some cases, the request portion generation component 722 may be configured to sub-portion or divide the request into a set of sub-requests. For instance, it may be desirable to have multiple sellers fulfill the request. In these cases, the request portion generation component 722 may generate a plurality of portions for the request that the cost estimate generation component 720 may provide individual cost estimate for each user on. Thus, in some cases, each seller may receive a plurality of cost estimates during each round. In some cases, the number or size of the portions generated by the request portion generation component 722 may differ per seller. For example, system may determine that a first seller is only able to reliably delver a first volume goods based on the historical seller information 736. In this example, the system may generate a cost estimate for a portion equal to or less than the volume that the seller has historically been able to provide reliably. In other examples, the request portion generation component 722 may also rely on buyer information 726, historical buyer information 728, request information 730, historical request information 732, seller information 734, ranking information 738 and/or cost estimate information 740 when determining a portion or sub-request for a seller.

It should be noted that reference to an "embodiment" in this document does not limit the described elements to a single embodiment; all described elements may be combined in any embodiment in any number of ways. Furthermore, for the purposes of interpreting this specification, the use of "or" herein means "and/or" unless stated otherwise. The use of "a" or "an" herein means "one or more" unless stated otherwise. The use of "comprise," "comprises," "comprising," "include," "includes," and "including" are interchangeable and not intended to be limiting. Also, unless otherwise stated, the use of the terms such as "first," "second," "third," "upper," "lower," and the like do not denote any spatial, sequential, or hierarchical order or importance, but are used to distinguish one element from another. It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It should also be appreciated by those skilled in the art that any block diagrams, steps, or sub-processes herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and so executed by a computer or processor, whether or not such computer or processor is explicitly shown. The order in which the methods are described are not intended to be construed as a limitation, and any number of the described method blocks can be deleted, moved, added, subdivided, combined, and/or modified in any order to implement the methods, or an alternative combination or sub-combinations. Also, while steps, sub-processes or blocks are at times shown as being performed in series, some steps, sub-processes or blocks can instead be performed in parallel, or can be performed at different times as may be recognized by a person of ordinary skill in the art. Further any specific numbers noted herein are only examples; alternative implementations can employ differing values or ranges. Furthermore, the methods and implementations described herein can be implemented in any suitable hardware, software, firmware, or combination thereof. For example, the methods and implementations described herein can utilize a number of user interfaces, including but not limited to any or all of user interfaces rendered via a device terminal (e.g., a keypad, a touchscreen, etc.), software installed on user devices (e.g., a mobile application, messaging services, etc.), a tablet computer, or a web interface. Furthermore, these user interfaces are often but not always supported by Internet cloud services.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A computer-implemented method for reducing spikes in bandwidth and network resource consumption associated with hosting an auction comprising:

receiving, by one or more servers of a contract negotiation system and from a first computing device of a buyer, a request for a product, wherein the request includes an indication that the request may be fulfilled in a plurality of portions;

receiving, by the one or more servers, a first response from a second computing device of a first seller to fulfill a first portion of the request;

receiving, by the one or more servers, a second response from a third computing device of a second seller to fulfill a second portion of the request;

accessing, by the one or more servers, data associated with the request;

generating, by the one or more servers and based at least in part on the data associated with the request and first seller information associated with the first seller, a first personalized cost estimate associated with the first seller to fulfill the first portion of the request, wherein the first personalized cost estimate is generated prior to submitting any cost estimate associated with the first seller to fulfill the first portion of the request to the first computing device of the buyer, and wherein the first personalized cost estimate includes a first cost for the first seller to charge the buyer to fulfill the first portion of the request;

generating, by the one or more servers and based at least in part on the data associated with the request and second seller information associated with the second seller, a second personalized cost estimate associated with the second seller to fulfill the second portion of the request, wherein the second personalized cost estimate is generated prior to submitting any cost estimate associated with the second seller to fulfill the second portion of the request to the first computing device of the buyer, and wherein the second personalized cost estimate includes a second cost for the second seller to charge the buyer to fulfill the second portion of the request;

transmitting, by the one or more servers and to the second computing device, the first personalized cost estimate without transmitting the second personalized cost estimate;

transmitting, by the one or more servers and to the third computing device, the second personalized cost estimate without transmitting the first personalized cost estimate;

receiving, by the one or more servers and from the second computing device, a first indication that the first seller has accepted the first personalized cost estimate;

receiving, by the one or more servers and from the third computing device, a second indication that the second seller has accepted the second personalized cost estimate; and responsive at least in part to receiving the first indication and the second indication, providing, by the one or more servers, the first personalized cost estimate and the second personalized cost estimate for acceptance by the buyer.

2. The computer-implemented method of claim 1, wherein the data associated with the request includes at least one of historical price data, user data, or market data.

3. The computer-implemented method of claim 1, wherein a size of the first portion and a size of the second portion is determined by the buyer as part of the request.

4. The computer-implemented method of claim 1, further comprising determining, by the one or more servers, a size of the first portion and a size of the second portion prior to generating the first personalized cost estimate and the second personalized cost estimate.

5. The computer-implemented method of claim 1, further comprising generating, by the one or more servers, a ranking of the first seller and the second seller based at least in part on the data associated with the request.

6. The computer-implemented method of claim 5, further comprising providing, by the one or more servers, the ranking to the first seller and the second seller.

7. The computer-implemented method of claim 1, wherein the first response and the second response are two of a plurality of responses received for fulfillment of the request.

8. The computer-implemented method of claim 7, wherein the first personalized cost estimate and the second personalized cost estimate are two of a plurality of personalized cost estimates generated, and wherein providing the first personalized cost estimate and the second personalized cost estimate for acceptance by the buyer is based at least in part on a ranking of the plurality of personalized cost estimates.

9. One or more non-transitory computer-readable media storing instructions executable by one or more processors that, when executed by the one or more processors, cause the one or more processors to perform acts comprising:

receiving, from a first computing device of a buyer, a request for a product, wherein the request includes an indication that the request may be fulfilled in a plurality of portions;

receiving a first response from a second computing device of a first seller to fulfill a first portion of the request;

receiving a second response from a third computing device of a second seller to fulfill a second portion of the request;

accessing data associated with the request;

generating, based at least in part on the data associated with the request and first seller information associated with the first seller, a first personalized cost estimate associated with the first seller to fulfill the first portion of the request, wherein the first personalized cost estimate is generated prior to submitting any cost estimate associated with the first seller to fulfill the first portion of the request to the first computing device of the buyer, and wherein the first personalized cost estimate includes a first cost for the first seller to charge the buyer to fulfill the first portion of the request;

generating, based at least in part on the data associated with the request and second seller information associated with the second seller, a second personalized cost estimate associated with the second seller to fulfill the second portion of the request, wherein the second personalized cost estimate is generated prior to submitting any cost estimate associated with the second seller to fulfill the second portion of the request to the first computing device of the buyer, and wherein the second personalized cost estimate includes a second cost for the second seller to charge the buyer to fulfill the second portion of the request;

transmitting, by the one or more processors and to the second computing device, the first personalized cost estimate without transmitting the second personalized cost estimate;

transmitting, by the one or more processors and to the third computing device, the second personalized cost estimate without transmitting the first personalized cost estimate;

receiving, from the second computing device, a first indication that the first seller has accepted the first personalized cost estimate;

receiving, from the third computing device, a second indication that the second seller has accepted the second personalized cost estimate; and responsive at least in part to receiving the first indication and the second indication, providing the first personalized cost estimate and the second personalized cost estimate for acceptance by the buyer.

10. The one or more non-transitory computer-readable media of claim 9, wherein the data associated with the request includes at least one of historical price data, user data, or market data.

11. The one or more non-transitory computer-readable media of claim 9, wherein a size of the first portion and a size of the second portion is determined by the buyer as part of the request.

12. The one or more non-transitory computer-readable media of claim 9, further comprising determining a size of the first portion and a size of the second portion prior to generating the first personalized cost estimate and the second personalized cost estimate.

13. The one or more non-transitory computer-readable media of claim 9, further comprising generating a ranking of the first seller and the second seller based at least in part on the data associated with the request.

14. The one or more non-transitory computer-readable media of claim 13, further comprising providing the ranking to the first seller and the second seller.

15. A system comprising:

one or more processors; and one or more non-transitory computer-readable media storing instructions executable by the one or more processors, wherein the instructions cause the one or more processors to perform acts comprising:

receiving, from a first computing device of a buyer, a request for a product, wherein the request includes an indication that the request may be fulfilled in a plurality of portions;

receiving a first response from a second computing device of a first seller to fulfill a first portion of the request;

receiving a second response from a third computing device of a second seller to fulfill a second portion of the request;

accessing data associated with the request;

generating, based at least in part on the data associated with the request and first seller information associated with the first seller, a first personalized cost estimate associated with the first seller to fulfill the first portion of the request, wherein the first personalized cost estimate is generated prior to submitting any cost estimate associated with the first seller to fulfill the first portion of the request to the first computing device of the buyer, and wherein the first personalized cost estimate includes a first cost to charge the buyer for the first seller to fulfill the first portion of the request;

generating, based at least in part on the data associated with the request and second seller information associated with the second seller, a second personalized cost estimate associated with the second seller, wherein the second personalized cost estimate is generated prior to submitting any cost estimate associated with the second seller to fulfill the second portion of the request to the first computing device of the buyer, and wherein the second personalized cost estimate includes a second cost for the second seller to charge the buyer to fulfill the second portion of the request;

transmitting, by the one or more processors and to the second computing device, the first personalized cost estimate without transmitting the second personalized cost estimate;

transmitting, by the one or more processors and to the third computing device, the second personalized cost estimate without transmitting the first personalized cost estimate;

receiving, from the second computing device, a first indication that the first seller has accepted the first personalized cost estimate;

receiving, from the third computing device, a second indication that the second seller has accepted the second personalized cost estimate; and responsive at least in part to receiving the first indication and the second indication, providing the first personalized cost estimate and the second personalized cost estimate for acceptance by the buyer.

16. The system of claim 15, wherein the data associated with the request includes at least one of historical price data, user data, or market data.

17. The system of claim 15, wherein a size of the first portion and a size of the second portion is determined by the buyer as part of the request.

18. The system of claim 15, further comprising determining a size of the first portion and a size of the second portion prior to generating the first personalized cost estimate and the second personalized cost estimate.

19. The system of claim 15, further comprising generating a ranking of the first seller and the second seller based at least in part on the data associated with the request.

20. The system of claim 19, further comprising providing the ranking to the first seller and the second seller.

* * * * *